United States Patent [19]
Currie et al.

[11] 3,823,623
[45] July 16, 1974

[54] SLITTING ROLL AND METHOD OF FABRICATING SAME

[75] Inventors: Grover C. Currie, Lenoir; Brendan L. Doll, Patterson, both of N.C.

[73] Assignee: Cellu Products Company, Patterson, N.C.

[22] Filed: Mar. 22, 1973

[21] Appl. No.: 343,677

[52] U.S. Cl.................. 76/101 A, 83/672, 83/678
[51] Int. Cl........................ B23p 15/40, B26d 4/66
[58] Field of Search......... 76/101 A, 101 R; 83/672, 83/678

[56] References Cited
UNITED STATES PATENTS
1,815,324  7/1931  Olson............................. 76/101 A
3,162,076  12/1964  Emerson et al.................. 83/678 X
3,570,337  3/1971  Morgan............................. 83/672
3,613,485  10/1971  Kelly et al........................ 76/101 A Primary Examiner—Donald R. Schran
Attorney, Agent, or Firm—Parrott, Bell, Seltzer, Park & Gibson

[57] ABSTRACT

A slitting roll for slitting an advancing sheet of elongate flexible foam material or the like to form a pattern of incisions therein. The roll includes a plurality of ribs of inverted V-shaped profile in the surface thereof, the ribs being disposed along a small helix angle with respect to the axis of the roll. A series of spaced radial apertures are formed in the ribs to define a plurality of spaced cutting blades, and the roll comprises a series of coaxial roll sections fixedly assembled onto a common supporting shaft.

15 Claims, 8 Drawing Figures

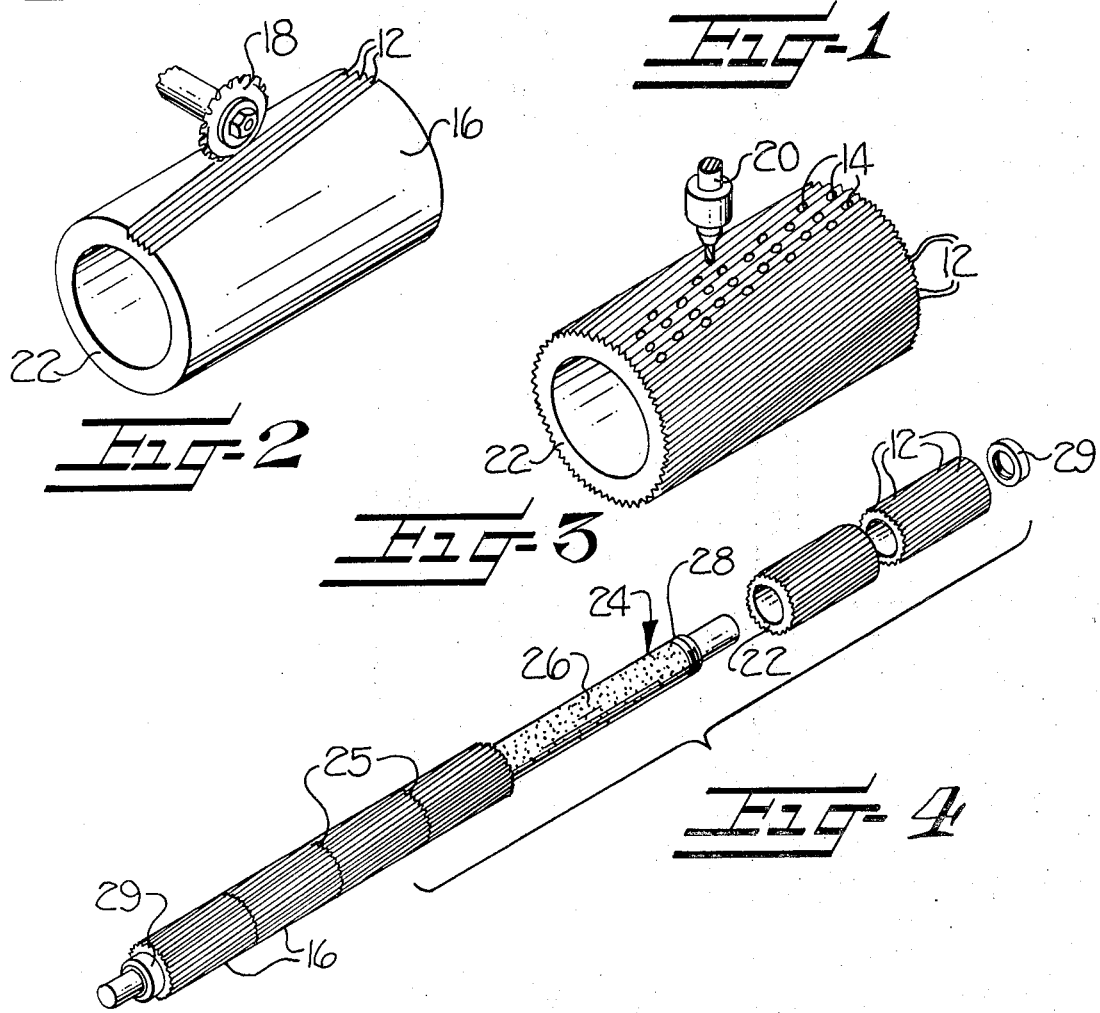

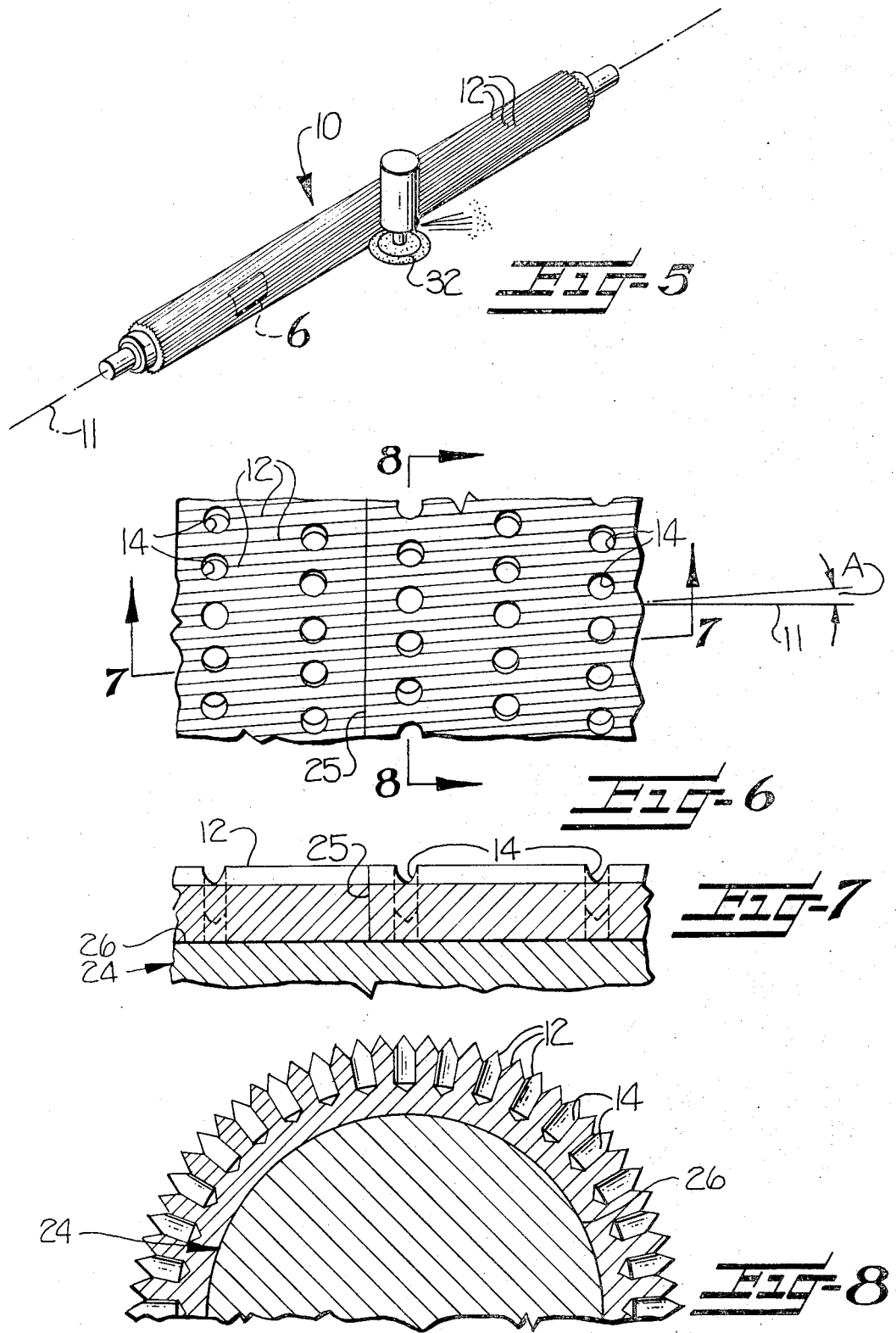

SLITTING ROLL AND METHOD OF FABRICATING SAME

The present invention relates to a slitting roll and method of fabricating the same, and wherein the roll is adapted for use in processing elongate foam sheet material to form the same into an open cushioning material to be used in packaging and protecting articles susceptible to damage during handling and shipment thereof.

The prior U.S. patent to Martin Doll, U.S. Pat. No. 3,642,967, and of common assignee, discloses a method of producing a net-like thermoplastic foam material of significant structural rigidity and which is adapted for use in various packaging applications. The method includes slitting a sheet of thermoplastic foam material in a pattern of spaced incisions, opening the incisions into lozenge-like form by a force applied to the material transversely of the rows of incisions, and heat setting the material in the opened condition.

In order to slit the foam material in accordance with the process of the above patent, it has been proposed to slit a sheet of thermoplastic foam material in a pattern of spaced incisions by passing the sheet between a slitting roll and a mating anvil roll, the slitting roll having spaced knives or cutting blades thereon to form the incisions. It has been found however that when it is desired to form the incisions in rows extending laterally across the advancing web, the axially extending rows of cutting blades on the slitting roll generate considerable chatter and vibration upon rotation in contact with the anvil roll. This not only results in the rapid deterioration of the apparatus, but it also significantly increases its power consumption.

Problems have also been encountered in attempting to fabricate a slitting roll having axially extending rows of cutting blades. For example, the slitting roll is typically about 48 inches long in order to handle a sheet of foam material having a conventional width of about 42 inches, and no satisfactory method of fabricating a roll of this length has been developed. More particularly, it will be understood that the cutting blades of the slitting roll should be heat hardened to achieve the necessary wear resistance, and such heat hardening can only be accomplished after the cutting blades are formed since a milling tool would not be able to cut the teeth in a hardened roll. However, a roll of the above length cannot be heat hardened without significant deformation, and such deformation would upset the orientation of the rows of cutting blades, thus making it impossible to finish grind or sharpen the hardened blades.

It is accordingly an object of the present invention to provide a slitting roll which may be used with a mating anvil roll to efficiently slit a longitudinally advancing sheet of elongate foam material in laterally extending rows of incisions and which avoids the disadvantages heretofore encountered.

It is another object of the present invention to provide a method of efficiently fabricating a slitting roll of the described type and which avoids any problem of deformation during heat treatment.

These and other objects and advantages of the present invention are achieved in the embodiment illustrated herein by the provision of a slitting roll which comprises a plurality of adjacent ribs on the surface thereof, the ribs being curved along a small helix with respect to the central axis of the roll. A plurality of equally spaced, radial apertures extend along the length of each rib to define a plurality of rows of spaced cutting blades and with the blades of adjacent rows being in staggered relationship. The roll is fabricated by a method which includes the steps of forming the ribs in the surface of each of a plurality of cylindrical tubular roll sections, drilling a series of equally spaced radial apertures along the length of each rib of each roll section, heat hardening the sections, and then fixedly assembling the same onto a common supporting shaft in abutting end to end, coaxial relationship.

Some of the objects of the invention having been stated, other objects will appear as the description proceeds, when taken in connection with the accompanying drawings, in which FIG. 1 is a block diagram of a method of fabricating a slitting roll in accordance with the present invention;

FIG. 2 is a fragmentary perspective view illustrating the step of forming the helical ribs on a roll section by means of a rotary cutting wheel;

FIG. 3 is a fragmentary perspective view illustrating the step of drilling spaced radial holes in the ribs to form rows of spaced cutting blades;

FIG. 4 is an exploded perspective view illustrating the step of assembling roll sections onto a common shaft;

FIG. 5 is a fragmentary perspective view illustrating the step of sharpening the profile of the ribs by means of an axially translated grinding wheel;

FIG. 6 is an enlarged elevation view of the portion of the surface of the slitting roll shown in the block 6 of FIG. 5;

FIG. 7 is a section view taken substantially along the line 7—7 of FIG. 6;

FIG. 8 is a transverse section taken perpendicular to the axis of the roll and substantially along the line 8—8 in FIG. 6.

Referring more specifically to the drawings, a substantially complete slitting roll embodying the features of the present invention is shown at 10 in FIG. 5. The illustrated roll may be employed for example in an apparatus of the type disclosed in copending application Ser. No. 343,678 by the present inventors filed concurrently herewith and entitled "APPARATUS FOR PROCESSING FOAM SHEET MATERIAL." Briefly described, the apparatus disclosed in the referenced copending application includes slitting means comprising a slitting roll and a mating anvil roll forming a nip therebetween and through which the advancing sheet material is passed such that a plurality of laterally extending rows of incisions is formed in the sheet material.

The surface of the slitting roll of the present invention is generally cylindrical to define a central axis 11, and comprises a plurality of ribs 12 formed therein, the ribs being curved along a small helix with respect to the axis 11 as indicated by the angle A in FIG. 6. As best seen in FIG. 8, the ribs have an inverted V-shaped profile, and a plurality of equally spaced, radial apertures 14 extend along each rib. The apertures of adjacent ribs are in staggered relationship to define a plurality of rows of spaced cutting blades of substantially equal length and spacing, and with the blades in adjacent rows being staggered. Thus the foam material drawn through the nip formed by the slitting roll and mating anvil roll is slit in a pattern of spaced apart laterally directed rows of spaced incisions and with the incisions in adjacent rows being in staggered relationship.

The particular helix angle A employed can vary somewhat, but the angle should be sufficient to permit at least three of the rows of cutting blades to simultaneously contact the anvil roll since this has been found desirable in preventing chatter. Also, the angle should not be so great as to cause a readily visible inclination in the lines of incisions in the finished foam material. In addition, too large a helix angle may cause difficulty during any subsequent drawing or opening operation on the foam material since the inclined incisions may cause the material to skew in the drawing rolls. In this regard, it has been found that in most applications the helix angle A should lie between about 2° and 10°. In such case, the rows of incisions formed in the foam material would extend between about 80° and 88° to the direction of advance. A helix angle of this order has been found to be sufficient to avoid the chatter or vibration associated with cutting blades which parallel the axis of the roll, and the angle of the rows of incisions is not readily apparent in the finished product and does not adversely effect subsequent processing.

The roll 10 may be fabricated by the method illustrated in FIG. 1. Initially, a plurality of axially directed channels are milled in the surface of each of a plurality of nonhardened, steel, tubular roll sections 16 by means of a rotary cutting wheel 18 or the like to define the ribs 12 therebetween. As illustrated, the cutting wheel 18 has a V-shaped cutting edge profile having about a 60° included angle, and the channels are positioned immediately adjacent each other such that the ribs 12 have a relatively sharp, inverted V-shaped profile also of about a 60° included angle. Each roll section 16 is typically about 8 inches in length, 4⅜ inches in outside diameter, and 3¼ inches in inside diameter. Such roll sections may have about 75 to 110 ribs formed in the surface thereof.

In order to form the ribs along the desired helix, each roll section 16 may be slowly rotated on its axis as the cutting wheel 18 is linearly translated along the length thereof. After one channel is formed, the roll section is forwardly indexed about its axis such that the wheel forms a new channel parallel to and immediately adjacent the previous channel. As will be apparent, the extent of the forward indexing is predetermined such that a desired number of complete channels (and thus ribs 12) is formed about the circumference of the roll. A machine adapted to form the ribs in the above manner, as well as sharpen the same as hereinafter further described, is disclosed in copending U.S. application Ser. No. 343,679 by Brendan Doll filed concurrently herewith and entitled "APPARATUS AND METHOD FOR FORMING SLITTING ROLL."

When the formation of the ribs is complete, a series of equally spaced, radial apertures is drilled through each rib employing a conventional drill press 20. The spaced apertures extend along the length of each rib, and the apertures in adjacent ribs are staggered as best seen in FIG. 6. Also, the apertures are equally spaced from the adjacent apertures in adjacent ribs such that the apertures of alternate ribs define a plurality of circumferential rows of apertures (e.g., along line 8—8 of FIG. 6.) Each of these circumferential rows of apertures lies in a plane perpendicular to the axis of the roll section, and the rows are equally spaced from each other. For the reason hereinafter explained, the circumferential rows are positioned at a predetermined distance with respect to the ends 22 of the roll sections.

With roll sections having the dimensions described above, the apertures 14 are typically spaced about 1½ inches from center to center along the ribs, and the apertures are about one-fourth inch deep. Also, the diameter of the apertures may be between about one-eighth and three-sixteenths inches, depending upon the lateral width of the rib.

After formation of the apertures 14 in a plurality of roll sections 16, the sections may be heat hardened to about 62–68 Rockwell C hardness. This may be accomplished in a conventional oven in a manner well known in the art. The ends 22 of each roll section may then be machine finished by grinding or the like to form a finished flat end surface which lies perpendicular to the axis of the roll to facilitate end to end engagement as hereinafter further explained.

Next, the roll sections 16 are fixedly assembled onto a common supporting shaft 24 in abutting end to end, coaxial relationship to form a joint 25 as seen in FIG. 6. As part of this process, the ribs of each roll section are aligned with the ribs of adjacent sections. More particularly, the predetermined spacing of the circumferential rows of apertures from the ends 22 permits the ribs in one roll section to be aligned with the proper ribs in the adjacent roll section such that the spacing of the apertures continues in an uninterrupted, equally spaced pattern across the end to end joint 25 to define axially directed rows of equally spaced cutting blades which extend from end to end of the completed roll 10, and with the blades of adjacent rows being in staggered relationship.

The diameter of the supporting shaft 24 is such as to closely receive the roll sections and the roll sections may be fixed thereto by means of an adhesive 26. Suitable adhesives for this purpose are known in the art, and one is sold under the trademark "Loctite" by The Loctite Corporation of Newington, Conn. Also, the ends of the supporting shaft 24 may include a threaded portion 28 and mating sleeve 29 to preclude axial movement of the sections on the shaft 24 while the adhesive sets.

As a final step in fabricating the roll 10, the profile of each rib may be sharpened by a suitable grinding wheel 32 as seen in FIG. 5. The grinding wheel 32 has a V-shaped cutting edge profile conforming to that of the channels formed by the rotary cutter 18, and the wheel is linearly translated along the length of the roll as the roll is rotated about its axis in a manner similar to that described above with respect to the action of the rotary cutter 18. The sharpening operation may be employed not only in the initial fabrication of the roll, but also after a period of use to resharpen the cutting blades.

In the drawings and specification, there has been set forth a preferred embodiment of the invention, and although specific terms are employed, they are used in a generic and descriptive sense only and not for purposes of limitation.

We claim:

1. A method of making a slitting roll suitable for slitting an advancing sheet of elongate flexible foam material or the like to form a pattern of spaced apart, laterally directed rows of spaced incisions in the sheet and with the incisions in adjacent rows being in staggered relationship, said method comprising the steps of forming a plurality of adjacent ribs of inverted V-shaped profile in the surface of a cylindrical roll and with the ribs being curved along a helix extending between about 2° and 10° with respect to the axis of the roll, and drilling a series of spaced radial apertures along the length of each rib and with the apertures of adjacent ribs being in staggered relationship to define a plurality of rows of spaced cutting blades and with the blades of adjacent rows being in staggered relationship.

2. The method as defined in claim 1 wherein the step of forming a plurality of adjacent ribs includes milling a plurality of channels in the surface of the roll with a rotary cutter to define the ribs therebetween and such that the ribs cover the entire surface of the roll.

3. The method as defined in claim 2 including the further subsequent step of sharpening each rib to obtain a sharpened edge along each cutting blade.

4. The method as defined in claim 3 wherein the step of sharpening each rib includes grinding each of the channels with a rotary grinding wheel having a V-shaped profile.

5. The method as defined in claim 4 wherein the step of drilling a series of apertures includes equally spacing the apertures along the length of each rib, and positioning the apertures so as to be substantially equally spaced from the adjacent apertures in the adjacent ribs.

6. The method as defined in claim 5 wherein the step of positioning the apertures includes aligning the apertures of alternate ribs to define a plurality of circumferential rows of apertures and with each of the rows of apertures lying in a plane which perpendicularly intersects the axis of the roll.

7. A method of making a slitting roll suitable for slitting an advancing sheet of elongate flexible foam material or the like to form a pattern of spaced apart rows of spaced incisions in the sheet and with the incisions in adjacent rows being in staggered relationship, said method comprising the steps of forming a plurality of adjacent ribs of inverted V-shaped profile in the surface of each of a plurality of cylindrical tubular roll sections, drilling a series of equally spaced, radial apertures along the length of each rib on each of the roll sections and with the adjacent apertures of adjacent ribs being in staggered relationship and equally spaced from each other, and fixedly assembling the tubular roll sections onto a common supporting shaft in abutting end to end, coaxial relationship and with the ribs of each section being aligned with the ribs of the adjacent sections to define a slitting roll having aligned ribs extending from end to end.

8. The method as defined in claim 7 wherein the step of drilling a series of apertures includes positioning the apertures so as to lie a predetermined distance from each end of each roll section, and the step of assembling the roll sections includes aligning the ribs such that the apertures in the aligned ribs continue their equally spaced arrangement across the end to end joints.

9. A method as defined in claim 7 wherein the step of forming the ribs includes curving the ribs along a helix extending from end to end of the roll section and at an angle of between about 2° and 10° with respect to the axis of the section.

10. The method as defined in claim 7 comprising the further step of heat hardening the tubular roll sections after forming and drilling the ribs and prior to assembling the same onto the supporting shaft.

11. The method as defined in claim 10 comprising the further step of machine finishing the ends of the hardened roll sections prior to assembling the same onto the supporting shaft to form a finished flat radial end surface to thereby facilitate end to end engagement during the subsequent assembly step.

12. The method as defined in claim 11 comprising the further step of sharpening the profile of each rib subsequent to the assembly step to obtain a plurality of sharpened, spaced cutting blades extending along the length of the slitting roll.

13. The method as defined in claim 12 wherein the step of assembling the tubular roll sections onto a common supporting shaft includes adhesively securing the sections to the shaft.

14. A method of making a slitting roll suitable for slitting an advancing sheet of elongate flexible foam material or the like to form a pattern of spaced apart rows of spaced incisions in the sheet and with the incisions in adjacent rows being in staggered relationship, said method comprising the steps of forming a plurality of adjacent ribs of inverted V-shaped profile in the surface of each of a plurality of cylindrical tubular roll sections, the ribs being curved along a helix such that at least three ribs on the completed slitting roll are adapted to simultaneously contact a mating anvil roll forming a nip therewith, drilling a series of equally spaced radial apertures along the length of each rib of each of the roll sections and while aligning the apertures of alternate ribs to define a plurality of equally spaced circumferential rows of apertures and with each of the rows of apertures lying in a plane which perpendicularly intersects the axis of the roll section and the rows being spaced a predetermined distance from each end of the associated roll section, then heat hardening the roll sections, and then fixedly assembling the roll sections onto a common supporting shaft in abutting end to end, coaxial relationship and with the ribs of each section being aligned with the ribs of the adjacent sections so as to define rows of equally spaced cutting blades extending in an uninterrupted pattern from end to end of the roll and with the blades of adjacent rows being in staggered relationship.

15. The method as defined in claim 14 comprising the further steps of machine finishing the ends of the hardened roll sections prior to assembling the same onto the supporting shaft, and sharpening the profile of each rib subsequent to the assembling step to obtain a plurality of sharpened, spaced cutting blades extending along the length thereof.

* * * * *